US010833307B2

(12) United States Patent
Xu et al.

(10) Patent No.: US 10,833,307 B2
(45) Date of Patent: Nov. 10, 2020

(54) SEPARATORS FOR ELECTROCHEMICAL CELLS

(71) Applicants: Optodot Corporation, Watertown, MA (US); Sihl GmbH, Duren (DE)

(72) Inventors: Zhong Xu, Holden, MA (US); Steven A. Carlson, Cambridge, MA (US)

(73) Assignees: Optodot Corporation, Devens, MA (US); Sihl GmbH, Düren (DE)

( * ) Notice: Subject to any disclaimer, the term of this patent is extended or adjusted under 35 U.S.C. 154(b) by 449 days.

(21) Appl. No.: 15/616,399

(22) Filed: Jun. 7, 2017

(65) Prior Publication Data

US 2017/0271638 A1    Sep. 21, 2017

Related U.S. Application Data

(63) Continuation of application No. 13/744,702, filed on Jan. 18, 2013, now abandoned, which is a continuation of application No. PCT/US2011/001274, filed on Jul. 18, 2011.

(60) Provisional application No. 61/399,883, filed on Jul. 19, 2010.

(51) Int. Cl.
| | |
|---|---|
| *H01M 2/16* | (2006.01) |
| *H01G 9/02* | (2006.01) |
| *H01G 11/52* | (2013.01) |
| *H01M 10/0525* | (2010.01) |

(52) U.S. Cl.
CPC ............ *H01M 2/166* (2013.01); *H01G 9/02* (2013.01); *H01G 11/52* (2013.01); *H01M 10/0525* (2013.01); *Y02E 60/13* (2013.01); *Y10T 428/249978* (2015.04)

(58) Field of Classification Search
CPC .. H01M 2/166; H01M 10/0525; H01G 11/52; H01G 9/02; Y02E 60/10; Y02E 60/13; Y10T 428/249978
See application file for complete search history.

(56) References Cited

U.S. PATENT DOCUMENTS

| | | | |
|---|---|---|---|
| 3,625,771 A | 12/1971 | Arrance et al. | |
| 3,647,554 A | 3/1972 | Arrance et al. | |
| 5,162,175 A | 11/1992 | Visco et al. | |
| 5,194,341 A | 3/1993 | Bagley et al. | |
| 5,314,765 A | 5/1994 | Bates | |
| 5,326,391 A | 7/1994 | Anderson et al. | |
| 5,340,669 A | 8/1994 | Chaloner-Gill et al. | |
| 5,350,645 A | 9/1994 | Lake et al. | |
| 5,415,954 A | 5/1995 | Gauthier et al. | |
| 5,418,091 A | 5/1995 | Gozdz et al. | |
| 5,439,760 A | 8/1995 | Howard et al. | |
| 5,549,717 A | 8/1996 | Takeuchi et al. | |
| 5,569,520 A | 10/1996 | Bates | |
| 5,597,659 A | 1/1997 | Morigaki et al. | |
| 5,691,005 A | 11/1997 | Morigaki et al. | |
| 5,731,104 A | 3/1998 | Ventura et al. | |
| 5,778,515 A | 7/1998 | Menon | |
| 5,824,434 A | 10/1998 | Kawakami et al. | |
| 5,840,087 A | 11/1998 | Gozdz et al. | |
| 5,882,721 A | 3/1999 | Delnick | |
| 5,894,656 A | 4/1999 | Menon et al. | |
| 5,948,464 A | 9/1999 | Delnick | |
| 6,148,503 A | 11/2000 | Delnick et al. | |
| 6,153,337 A * | 11/2000 | Carlson ............... | B01D 71/025 |
| | | | 429/247 |
| 6,162,563 A | 12/2000 | Miura et al. | |
| 6,183,901 B1 | 2/2001 | Ying et al. | |
| 6,190,426 B1 | 2/2001 | Thibault | |
| 6,194,098 B1 | 2/2001 | Ying et al. | |
| 6,224,846 B1 | 5/2001 | Hurlburt et al. | |
| 6,268,087 B1 | 7/2001 | Kim et al. | |
| 6,277,514 B1 | 8/2001 | Ying et al. | |
| 6,287,720 B1 | 9/2001 | Yamashita et al. | |
| 6,306,545 B1 | 10/2001 | Carlson et al. | |
| 6,328,770 B1 | 12/2001 | Gozdz | |
| 6,344,293 B1 | 2/2002 | Geronov | |

(Continued)

FOREIGN PATENT DOCUMENTS

| | | |
|---|---|---|
| CA | 2605874 | 1/2007 |
| CN | 101796668 | 8/2010 |

(Continued)

OTHER PUBLICATIONS

Min Kim et al., "Preparation of a Trilayer Separator and Its Application to Lithium-ion Batteries", Journal of Power Sources, Elesevier SA, CH, vol. 195, No. 24, Jul. 2, 2010, pp. 8302-8305.
Daigo Takemura, et al., "A Powder Particle Size Effect on Ceramic Powder Based Separator for Lithium Rechargeable Battery", Journal of Power Sources, Elesevier SA, vol. 146, 2005, pp. 779-783.
R.J.R. Uhlhorn, et al., "Synthesis of Ceramic Membranes", Journal of Materials Science 27 (1992) 527-537.
Korean Office Action—Application No. 10-2013-7003965—dated Dec. 28, 2018, which is a KR counterpart to U.S. Appl. No. 15/616,399.
Japanese Office Action—Application No. 2016-143054—dated Apr. 17, 2018, which is a JP counterpart to U.S. Appl. No. 15/616,399.

(Continued)

*Primary Examiner* — Miriam Stagg
*Assistant Examiner* — Lilia Nedialkova
(74) *Attorney, Agent, or Firm* — Amster, Rothstein & Ebenstein LLP

(57) ABSTRACT

Provided are separators for use in batteries and capacitors comprising (a) at least 50% by weight of an aluminum oxide and (b) an organic polymer, wherein the aluminum oxide is surface modified by treatment with an organic acid to form a modified aluminum oxide, and wherein the treatment provides dispersibility of the aluminum oxide in aprotic solvents such as N-methyl pyrrolidone. Preferably, the organic acid is a sulfonic acid, such as p-toluenesulfonic acid. Also preferably, the organic polymer is a fluorinated polymer, such as polyvinylidene fluoride. Also provided are electrochemical cells and capacitors comprising such separators.

36 Claims, No Drawings

(56) References Cited

U.S. PATENT DOCUMENTS

| | | |
|---|---|---|
| 6,410,182 B1 | 6/2002 | Ying et al. |
| 6,423,444 B1 | 7/2002 | Ying et al. |
| 6,432,586 B1 | 8/2002 | Zhang |
| 6,444,344 B1 | 9/2002 | Saito et al. |
| 6,451,484 B1 | 9/2002 | Han et al. |
| 6,488,721 B1 | 12/2002 | Carlson |
| 6,497,780 B1 | 12/2002 | Carlson |
| 6,679,926 B1 | 1/2004 | Kajiura |
| 6,723,467 B2 | 4/2004 | Yoshida et al. |
| 6,811,928 B2 | 11/2004 | Aihara et al. |
| 6,846,435 B1 | 1/2005 | Bohnen et al. |
| 7,014,948 B2 | 3/2006 | Lee et al. |
| 7,029,796 B2 | 4/2006 | Choi et al. |
| 7,066,971 B1 | 6/2006 | Carlson |
| 7,070,632 B1 | 7/2006 | Visco et al. |
| 7,081,142 B1 | 7/2006 | Carlson |
| 7,115,339 B2 | 10/2006 | Nakajima et al. |
| 7,135,250 B2 | 11/2006 | Sasaki et al. |
| 7,160,603 B2 | 1/2007 | Carlson |
| 7,378,185 B2 | 5/2008 | Fujikawa et al. |
| 7,396,612 B2 | 7/2008 | Ohata et al. |
| 7,402,184 B2 | 7/2008 | Ikuta et al. |
| 7,419,743 B2 | 9/2008 | Fujikawa et al. |
| 7,422,825 B2 | 9/2008 | Inoue et al. |
| 7,470,488 B2 | 12/2008 | Lee et al. |
| 7,560,193 B2 | 7/2009 | Ikuta et al. |
| 7,575,606 B2 | 8/2009 | Fukumoto et al. |
| 7,595,130 B2 | 9/2009 | Kawabata et al. |
| 7,638,230 B2 | 12/2009 | Fujita et al. |
| 7,638,241 B2 | 12/2009 | Lee et al. |
| 7,662,517 B2 | 2/2010 | Lee et al. |
| 7,674,559 B2 | 3/2010 | Min et al. |
| 7,682,740 B2 | 3/2010 | Yong et al. |
| 7,682,751 B2 | 3/2010 | Kato et al. |
| 7,687,202 B2 | 3/2010 | Nishino et al. |
| 7,695,870 B2 | 4/2010 | Park et al. |
| 7,704,641 B2 | 4/2010 | Yong et al. |
| 7,709,140 B2 | 5/2010 | Hennige |
| 7,709,152 B2 | 5/2010 | Kim et al. |
| 7,709,153 B2 | 5/2010 | Lee et al. |
| 7,745,042 B2 | 6/2010 | Fujino et al. |
| 7,745,050 B2 | 6/2010 | Kajita et al. |
| 7,754,375 B2 | 7/2010 | Fujikawa et al. |
| 7,754,377 B2 | 7/2010 | Ohata et al. |
| 7,758,998 B2 | 7/2010 | Ohata et al. |
| 7,759,004 B2 | 7/2010 | Ikuta et al. |
| 7,811,700 B2 | 10/2010 | Hennige et al. |
| 7,816,038 B2 | 10/2010 | Ohata et al. |
| 7,829,242 B2 | 11/2010 | Hörpel et al. |
| 7,981,548 B2 | 7/2011 | Mimura |
| 8,277,981 B2 | 10/2012 | Kim et al. |
| 8,883,347 B2 | 11/2014 | Baba et al. |
| 8,883,354 B2 | 11/2014 | Carlson et al. |
| 8,962,182 B2 | 2/2015 | Carlson |
| 9,065,120 B2 | 6/2015 | Carlson |
| 9,070,954 B2 | 6/2015 | Carlson et al. |
| 9,118,047 B2 | 8/2015 | Carlson |
| 9,180,412 B2 | 11/2015 | Jo et al. |
| 9,209,446 B2 | 12/2015 | Carlson |
| 9,660,297 B2 | 5/2017 | Carlson |
| 9,871,239 B2 | 1/2018 | Carlson et al. |
| 2001/0000485 A1 | 4/2001 | Ying et al. |
| 2001/0038938 A1 | 11/2001 | Takahashi et al. |
| 2001/0053475 A1 | 12/2001 | Ying et al. |
| 2002/0092155 A1 | 7/2002 | Carlson et al. |
| 2002/0106561 A1 | 8/2002 | Lee et al. |
| 2002/0141029 A1 | 10/2002 | Carlson et al. |
| 2003/0003363 A1 | 1/2003 | Daido |
| 2003/0035995 A1 | 2/2003 | Ohsaki et al. |
| 2003/0118910 A1 | 6/2003 | Carlson |
| 2003/0171784 A1 | 9/2003 | Dodd et al. |
| 2004/0038090 A1 | 2/2004 | Faris |
| 2004/0043295 A1 | 3/2004 | Rodriguez et al. |
| 2004/0058246 A1 | 3/2004 | Choi et al. |
| 2004/0175626 A1 | 9/2004 | Dasgupta |
| 2004/0185335 A1 | 9/2004 | Carlson |
| 2004/0188880 A1 | 9/2004 | Bauer et al. |
| 2004/0241540 A1 | 12/2004 | Tsutsumi et al. |
| 2005/0221190 A1 | 10/2005 | Sudano et al. |
| 2005/0255345 A1 | 11/2005 | Gerritse |
| 2005/0266305 A1 | 12/2005 | Ohata et al. |
| 2006/0008698 A1 | 1/2006 | Kim et al. |
| 2006/0127753 A1 | 6/2006 | Nakashima et al. |
| 2006/0172158 A1 | 8/2006 | Min et al. |
| 2006/0172185 A1 | 8/2006 | Mimura |
| 2006/0177732 A1 | 8/2006 | Visco et al. |
| 2006/0222954 A1 | 10/2006 | Skotheim et al. |
| 2006/0275661 A1 | 12/2006 | Kim et al. |
| 2007/0009803 A1 | 1/2007 | Kim et al. |
| 2007/0065714 A1 | 3/2007 | Hambitzer et al. |
| 2007/0108120 A1 | 5/2007 | Carlson |
| 2007/0110990 A1 | 5/2007 | Carlson |
| 2007/0111070 A1 | 5/2007 | Carlson |
| 2007/0178384 A1 | 8/2007 | Kajita et al. |
| 2007/0184350 A1 | 8/2007 | Kim et al. |
| 2007/0189959 A1 | 8/2007 | Carlson et al. |
| 2007/0190408 A1 | 8/2007 | Inoue et al. |
| 2007/0190427 A1 | 8/2007 | Carlson et al. |
| 2007/0204458 A1 | 9/2007 | Fujita et al. |
| 2007/0243460 A1 | 10/2007 | Carlson et al. |
| 2007/0269714 A1 | 11/2007 | Watanabe et al. |
| 2008/0032197 A1 | 2/2008 | Horpel et al. |
| 2008/0166202 A1 | 7/2008 | Dunlap et al. |
| 2008/0182174 A1 | 7/2008 | Carlson et al. |
| 2008/0285208 A1 | 11/2008 | Sung et al. |
| 2009/0017380 A1 | 1/2009 | Honda et al. |
| 2009/0067119 A1 | 3/2009 | Katayama et al. |
| 2009/0087728 A1 | 4/2009 | Less et al. |
| 2009/0155678 A1 | 6/2009 | Less |
| 2009/0181300 A1* | 7/2009 | Kim ................. H01M 4/139 429/185 |
| 2009/0197183 A1 | 8/2009 | Kato |
| 2009/0202912 A1 | 8/2009 | Baba et al. |
| 2009/0246636 A1 | 10/2009 | Chiang et al. |
| 2009/0269489 A1 | 10/2009 | Hennige et al. |
| 2010/0003595 A1 | 1/2010 | Issaev et al. |
| 2010/0055370 A1 | 3/2010 | Diehl |
| 2010/0175245 A1 | 7/2010 | Do et al. |
| 2010/0221965 A1* | 9/2010 | Katayama ............ H01G 9/02 442/59 |
| 2010/0261065 A1 | 10/2010 | Babinec et al. |
| 2011/0052987 A1 | 3/2011 | Katayama et al. |
| 2011/0097623 A1 | 4/2011 | Marinis, Jr. et al. |
| 2011/0281171 A1 | 11/2011 | Yong et al. |
| 2012/0064399 A1 | 3/2012 | Carlson |
| 2012/0064404 A1 | 3/2012 | Carlson |
| 2012/0141877 A1 | 6/2012 | Choi et al. |
| 2012/0189898 A1 | 7/2012 | Wakizaka et al. |
| 2012/0258348 A1 | 10/2012 | Hayakawa |
| 2013/0089770 A1 | 4/2013 | Nishikawa |
| 2013/0171500 A1 | 7/2013 | Xu et al. |
| 2013/0260207 A1 | 10/2013 | Uemura |
| 2014/0170464 A1 | 6/2014 | Iwase |
| 2015/0162586 A1 | 6/2015 | Fleischmann et al. |
| 2015/0249249 A1 | 9/2015 | Ortega et al. |
| 2015/0299551 A1 | 10/2015 | Ota et al. |
| 2015/0364790 A1 | 12/2015 | Yonehara et al. |
| 2016/0141621 A1 | 5/2016 | Negishi et al. |
| 2016/0164145 A1 | 6/2016 | Carlson |
| 2017/0012264 A1 | 1/2017 | Carlson et al. |
| 2017/0098857 A1 | 4/2017 | Carlson |
| 2017/0222206 A1 | 8/2017 | Carlson |
| 2017/0271638 A1 | 9/2017 | Xu et al. |
| 2018/0047963 A1 | 2/2018 | Carlson et al. |

FOREIGN PATENT DOCUMENTS

| | | |
|---|---|---|
| CN | 102437302 | 5/2012 |
| CN | 102640329 | 8/2012 |
| EP | 0143562 A1 | 6/1985 |
| EP | 0523840 B1 | 1/1993 |
| EP | 0600718 B1 | 6/1994 |
| EP | 0814520 A2 | 12/1997 |
| EP | 0836238 B1 | 4/1998 |

(56) References Cited

FOREIGN PATENT DOCUMENTS

| | | |
|---|---|---|
| EP | 0848435 B1 | 6/1998 |
| EP | 0875950 A2 | 11/1998 |
| EP | 0892449 A1 | 1/1999 |
| EP | 1156544 | 11/2011 |
| EP | 2 596 538 B1 | 12/2018 |
| JP | H06140077 | 5/1994 |
| JP | H08255615 | 10/1996 |
| JP | H0927343 | 1/1997 |
| JP | H10214639 | 8/1998 |
| JP | H11233144 A | 8/1999 |
| JP | 2000323129 A | 11/2000 |
| JP | 2002042882 | 2/2002 |
| JP | 2003517418 A | 5/2003 |
| JP | 2003223926 | 8/2003 |
| JP | 2005235695 | 2/2005 |
| JP | 2007227136 | 9/2007 |
| JP | 2007258160 | 10/2007 |
| JP | 2008041404 | 2/2008 |
| JP | 2008123988 | 5/2008 |
| JP | 2008210541 | 9/2008 |
| JP | 2010056036 | 3/2010 |
| JP | 5183016 B2 | 4/2013 |
| JP | 2013535773 | 9/2013 |
| KR | 1020090052556 | 5/2009 |
| WO | 9102385 A1 | 2/1991 |
| WO | 9103080 A1 | 3/1991 |
| WO | 9931751 | 6/1999 |
| WO | 9933125 A1 | 7/1999 |
| WO | 99057770 A1 | 11/1999 |
| WO | 0076011 A | 12/2000 |
| WO | 0103824 | 1/2001 |
| WO | 0139303 | 5/2001 |
| WO | 2001039293 | 5/2001 |
| WO | 2005022674 A1 | 3/2005 |
| WO | 2007095348 | 8/2007 |
| WO | 2009014388 | 1/2009 |
| WO | 2009026467 A1 | 2/2009 |
| WO | 2009066946 | 5/2009 |
| WO | WO-2009096451 A1 * | 8/2009 ......... H01M 2/1673 |
| WO | 2010016881 | 2/2010 |
| WO | 2010138176 | 12/2010 |
| WO | 2010138177 | 12/2010 |
| WO | 2010138179 | 12/2010 |
| WO | 2012011944 | 1/2012 |
| WO | 2013146126 | 10/2013 |

OTHER PUBLICATIONS

Chinese Office Action—Application No. 201710017940.5—dated Oct. 26, 2018, which is a CN counterpart to U.S. Appl. No. 15/616,399.

European Patent Office, Nov. 22, 2018 Decision to Grant the Counterpart European Patent EP2596538.

* cited by examiner

SEPARATORS FOR ELECTROCHEMICAL CELLS

CROSS REFERENCE TO RELATED APPLICATIONS

This application is a Continuation of U.S. patent application Ser. No. 13/744,702, filed Jan. 18, 2013, which is a continuation of International Application Serial No. PCT/US2011/001274, filed Jul. 18, 2011, which claims the benefit of U.S. Provisional Patent Application Ser. No. 61/399,883, filed Jul. 19, 2010, the entirety of each of which is hereby incorporated by reference.

FIELD OF THE INVENTION

The present invention relates generally to the field of porous membranes and to the fields of electric current producing cells and of separators for use in electric current producing cells. More particularly, this invention pertains to a porous separator membrane comprising an aluminum oxide and an organic polymer where the aluminum oxide has been surface modified by treatment with an organic acid to provide dispersibility in aprotic organic solvents. Also, the present invention pertains to electric current producing cells, such as lithium ion cells and capacitors, comprising such porous separators.

BACKGROUND

An electroactive material that has been fabricated into a structure for use in an electrochemical cell is referred to as an electrode. Of a pair of electrodes used in an electrochemical cell, the electrode on the electrochemically higher potential side is referred to as the positive electrode or the cathode, while the electrode on the electrochemically lower potential side is referred to as the negative electrode, or the anode. A battery may contain one or more electrochemical cells.

To prevent the undesirable flow of the electrons in a short circuit internally from the anode to the cathode, an electrolyte element is interposed between the cathode and the anode. This electrolyte element must be electronically non-conductive to prevent short circuits, but must permit the transport of ions between the anode and the cathode. The electrolyte element should also be stable electrochemically and chemically toward both the anode and the cathode.

Typically, the electrolyte element contains a porous material, referred to as a separator (since it separates or insulates the anode and the cathode from each other), and an aqueous or non-aqueous electrolyte, that usually comprises an ionic electrolyte salt and ionically conductive material, in the pores of the separator. A variety of materials have been used for the porous layer or separator of the electrolyte element in electrochemical cells. These porous separator materials include polyolefins such as polyethylenes and polypropylenes, glass fiber filter papers, and ceramic materials. Usually these separator materials are supplied as porous free-standing membranes that are interleaved with the anodes and the cathodes in the fabrication of electrochemical cells.

A liquid organic electrolyte containing organic solvents and lithium salts is typically used as the electrolyte in the pores of the separator in the electrolyte element for rechargeable or secondary lithium ion and non-rechargeable or primary lithium electrochemical cells. Alternatively, a gel or solid polymer electrolyte containing an ionically conductive polymer and lithium salts, and optionally organic solvents, might be utilized instead of the liquid organic electrolyte.

In addition to being porous and chemically stable to the other materials of the electric current producing cell, the separator should be flexible, thin, economical in cost, and have good mechanical strength and safety properties.

High porosity in the separator is important for obtaining the high ionic conductivity needed for effective performance in most batteries, except, for example, those batteries operating at relatively low charge and discharge rates, and for efficiency in capacitors, such as supercapacitors. It is desirable for the separator to have a porosity of at least 30 percent, and preferably 40 percent or higher, in lithium ion batteries.

Another highly desirable feature of the separator in the electrolyte element is that it is readily wetted by the electrolyte materials that provide the ionic conductivity. When the separator material is a polyolefin material that has non-polar surface properties, the electrolyte materials (which typically have highly polar properties) often poorly wet the separator material. This results in longer times to fill the battery with electrolyte and potentially in low capacities in the battery due to a non-uniform distribution of electrolyte materials in the electrolyte element.

The separators used for lithium ion batteries are typically polyolefin separators, which melt at below 200° C. and are very flammable. The lithium ion batteries, as well as lithium primary batteries and some capacitors, utilize highly flammable organic solvents in their electrolytes. A non-melting and flame retardant separator would help prevent the spread of any burning of the organic electrolyte, caused by an internal short circuit, thermal runaway, or other unsafe condition, that might spread into a larger area of the battery or capacitor and cause a major explosion. As lithium ion batteries are increasingly utilized for high power applications, such as for electric vehicles, the need for improved safety is greatly increased because of the very large size and high power rates of these vehicle batteries.

A separator that is applicable for lithium ion and other electric current producing cells and that has flame retardant and non-melting properties that provide safety against internal short shorts and thermal runaway, while maintaining the chemical stability of the electrolyte and of the separator, would be of great value to the battery and capacitor industry.

SUMMARY OF THE INVENTION

To achieve increased safety in separators for use in electric current producing cells such as batteries and capacitors, the present invention utilizes non-flammable inorganic oxides, such as aluminum oxides, and preferably non-flammable organic polymers having fluorinated groups in the separators. This invention utilizes various inorganic oxide particle pretreatment, mixing, coating, drying, and delaminating methods for preparing such separators.

One aspect of the present invention pertains to a separator for an electric current producing cell, wherein the separator comprises a microporous layer comprising (a) at least 50% by weight of an aluminum oxide and (b) an organic polymer, wherein the aluminum oxide is surface modified by treatment with an organic acid to form a modified aluminum oxide. In one embodiment, the organic acid is a sulfonic acid, preferably an aryl sulfonic acid, and more preferably a toluenesulfonic acid. In one embodiment, the organic acid is a carboxylic acid. In one embodiment, the aluminum oxide comprises a hydrated aluminum oxide of the formula $Al_2O_3 \cdot xH_2O$, wherein x is in the range of 1.0 to 1.5, and wherein the hydrated aluminum oxide is surface modified by treatment with an organic acid to form a modified hydrated aluminum oxide. In one embodiment, the modified aluminum oxide has an $Al_2O_3$ content in the range of 50 to 85% by weight. In one embodiment, the modified aluminum oxide has an $Al_2O_3$ content in the range of 65 to 80% by weight. In one embodiment, the separator comprises 60 to 90% by weight of the modified aluminum oxide. In one embodiment, the separator comprises 70 to 85% by weight of the modified aluminum oxide. In one embodiment, the microporous layer is a xerogel layer. In one embodiment, the organic polymer comprises a polyvinylidene fluoride polymer. In one embodiment, the separator comprises a copolymer of a first fluorinated organic monomer and a second organic monomer. In one embodiment, the second organic monomer is a second fluorinated organic monomer.

In one embodiment of the separators of this invention, the electric current producing cell is a secondary lithium ion cell. In one embodiment, the electric current producing cell is a primary lithium cell. In one embodiment, the electric current producing cell is a capacitor. In one embodiment, the separator does not melt at temperatures lower than 300° C. In one embodiment, the separator is a flame retardant separator.

Another aspect of the present invention pertains to an electrochemical cell comprising an anode, a cathode, an organic electrolyte comprising a lithium salt, and a separator interposed between the anode and the cathode, wherein the separator comprises a microporous layer comprising (a) at least 50% by weight of an aluminum oxide and (b) an organic polymer, wherein the aluminum oxide is surface modified by treatment with an organic acid. In one embodiment, the organic acid is a sulfonic acid, preferably an aryl sulfonic acid, and more preferably a toluenesulfonic acid. In one embodiment, the organic acid is a carboxylic acid. In one embodiment, the aluminum oxide comprises a hydrated aluminum oxide of the formula $Al_2O_3.xH_2O$, wherein x is in the range of 1.0 to 1.5, and wherein the hydrated aluminum oxide is surface modified by treatment with an organic acid to form a modified hydrated aluminum oxide.

In one embodiment of the electrochemical cells of this invention, the microporous layer is a xerogel layer. In one embodiment, the anode active material of the anode is lithium. In one embodiment, the modified aluminum oxide has an $Al_2O_3$ content in the range of 50 to 85% by weight. In one embodiment, the modified aluminum oxide has an $Al_2O_3$ content in the range of 65 to 80% by weight. In one embodiment, the organic polymer comprises a polyvinylidene fluoride polymer. In one embodiment, the organic polymer comprises a copolymer of a first fluorinated organic monomer and a second organic monomer. In one embodiment, the second organic monomer is a second fluorinated organic monomer. In one embodiment, the lithium salt is lithium hexafluorophosphate.

Another aspect of the present invention relates to a capacitor comprising two electrodes, an organic electrolyte comprising a tetraalkyl ammonium salt, and a separator interposed between the two electrodes, wherein the separator comprises a microporous layer comprising (a) at least 50% by weight of an aluminum oxide and (b) an organic polymer, wherein the aluminum oxide is surface modified by treatment with an organic acid to form a modified aluminum oxide. In one embodiment, the inorganic oxide comprises a hydrated aluminum oxide of the formula $Al_2O_3.xH_2O$ wherein x is in the range of 1.0 to 1.5, wherein the aluminum oxide is surface modified by treatment with an organic acid to form a modified aluminum oxide. In one embodiment, the organic acid is a sulfonic acid. In one embodiment, the microporous layer is a xerogel layer. In one embodiment, the organic polymer comprises a polyvinylidene fluoride polymer. In one embodiment, the organic polymer comprises a copolymer of a first fluorinated organic monomer and a second organic monomer.

DETAILED DESCRIPTION OF THE INVENTION

The separators of the present invention provide superior safety and other key performance properties for use in electric current producing cells, including, but not limited to, lithium batteries and capacitors.

Methods of preparing microporous xerogel separators for electrochemical cells are described in U.S. Pat. Nos. 6,153,337 and 6,306,545, and in U.S. Pat. Application 20020092155, all to Carlson et al. The liquid mixture described in these references for coating xerogel separators comprises an inorganic oxide, an organic binder, and typically water as the volatile liquid in the mixture. Optionally, the liquid mixture comprises organic solvents, preferably protic organic solvents. Examples of protic organic solvents are alcohols and glycols.

The drying process to form a xerogel layer involves the removal of the liquid in the liquid mixture. As is known in the art of inorganic oxide xerogel coatings, as the liquid is removed, the colloidal particles of inorganic oxide sol form a gel that, upon further loss of liquid, forms a 3-dimensional microporous network of inorganic oxide. By the terms "xerogel layer" and "xerogel structure," as used herein, is meant, respectively, a layer of a coating or the structure of a coating layer in which the layer and structure were formed by drying a liquid sol or sol-gel mixture to form a solid gel matrix as, for example, described in *Chem. Mater.*, Vol. 9, pages 1296 to 1298 (1997) by Ichinose et al. for coating layers of inorganic oxide based xerogels.

Thus, if the liquid of the gel formed in the liquid sol-gel mixture is removed substantially, for example, through the formation of a liquid-vapor boundary phase, the resulting gel layer or film is termed, as used herein, a xerogel layer. Thus, the microporous xerogel layers of this invention comprise a dried microporous three-dimensional solid network with pores which are interconnected in a substantially continuous fashion from one outermost surface of the layer through to the other outermost surface of the layer. A continuous xerogel coating layer has the materials of the xerogel in a continuous structure in the coating layer, i.e., the materials, such as inorganic oxide particles, are in contact and do not have discontinuities in the structure, such as a discontinuous layer of solid pigment particles that are separated from each other.

In contrast, xerogel pigment particles may be formed by a xerogel process involving drying a liquid solution of a suitable precursor to the pigment to form a dried mass of xerogel pigment particles, which is typically then ground to a fine powder to provide xerogel pigment particles. The microporous inorganic oxide layers of this invention may be, but are not limited to, xerogel layers. The inorganic oxide layers of the present invention may also be discontinuous layers of solid pigment particles that are not a xerogel coating layer and have discontinuities of solid pigment particles that are separated from each other in the structure of the discontinuous layer. This separation typically involves organic polymer interposed between the pigment particles. The terms "xerogel coating" and "xerogel coating layer," as used herein, are synonymous with the term "xerogel layer."

As used herein, the term "microporous" describes the material of a layer or coating, in which the material possesses pores of a diameter of about 1 micron or less. As used herein, the term "nanoporous" describes the material of a layer or coating, in which the material possesses pores of a diameter of about 100 nanometers or less.

Preferably for battery and capacitor separator applications, these pores are connected in a substantially continuous fashion from one outermost surface of the microporous layer through to the other outermost surface of the layer. This substantially continuous 3-dimensional microporous inorganic oxide network is efficient in allowing the diffusion of ions, such as lithium ions, through the separator during the charging and discharging of the electric current producing cell.

The amount of the pores in the separator may be characterized by the percent porosity or percent pore volume, which is the cubic centimeters of pores per cubic centimeters of the separator. The porosity may be measured by filling the pores with a relatively non-volatile liquid having a known density and then calculated by the increase in weight of the separator with the liquid present divided by the known density of the liquid and then dividing this quotient by the volume of the separator, as calculated from the area and average thickness of the separator.

In one embodiment of the separators of this invention, the average pore diameter of the microporous inorganic oxide layer is from 2 nm to 70 nm. Typically, the average pore diameter of the microporous inorganic oxide layer is from 30 to 50 nm. These extremely small pores, that are about 5 to 10 times smaller than the average pore dimensions of polyolefin separators, present no limitation to high conductivity with lithium salt electrolytes. Thus, the pore sizes of the separators of this invention may provide ion transport and conductivity with lithium ion battery electrolytes that is at least equal to that of polyolefin separators.

In one embodiment of the separators of this invention, the inorganic oxide is an aluminum oxide. Other inorganic oxides, such as zirconium oxides and silicas, as known in the art of electrolyte elements and separators for electrochemical cells, may be utilized alone or in combination with other inorganic oxides including aluminum oxides. Preferred aluminum oxides are aluminum boehmites. The term "pseudo-boehmite," as used herein, pertains to hydrated aluminum oxides having the chemical formula, $Al_2O_3.xH_2O$, wherein x is in the range of 1.0 to 1.5. Terms used herein, which are synonymous with "pseudo-boehmite," include "aluminum boehmite," "boehmite," "AlOOH," and "hydrated alumina." The materials referred to herein as "pseudo-boehmite" are distinct from anhydrous aluminum oxides or aluminas ($Al_2O_3$ such as alpha-alumina or gamma-alumina) and hydrated aluminum oxides of the formula $Al_2O_3.xH_2O$ wherein x is less than 1.0 or greater than 1.5. In one embodiment of the separators of the present invention, the weight percent of the aluminum oxide in the separator is greater than 50%. This loading of the aluminum oxide helps to provide the porosity of the separator that is needed for conductivity and for rapid wetting by the electrolyte when manufacturing the electric current producing cell.

One aspect of the present invention pertains to a separator for an electric current producing cell, wherein the separator comprises a microporous layer comprising (a) at least 50% by weight of an aluminum oxide and (b) an organic polymer, wherein the aluminum oxide is surface modified by treatment with an organic acid to form a modified aluminum oxide. The separator may contain only the microporous layer of this invention or may contain additional microporous layers, such as porous polyolefin layers as typically used in lithium ion batteries. For example, the microporous layer of the present invention may be coated on one or both sides of a microporous polyolefin layer, such as Celgard 2500, the trade name for a polyolefin separator membrane available from Polypore, Inc., of Charlotte, N.C. Whereas a thickness of 5 to 20 microns is typical for the separators of this invention that contain only the microporous layers of this invention, the thickness of a coating of the microporous layer of this invention onto a polyolefin microporous separator is typically in, but not limited to, the range of 1 to 4 microns.

In one embodiment of the separators of the present invention, the organic acid is a sulfonic acid, preferably an aryl sulfonic acid, and more preferably a toluenesulfonic acid. In one embodiment, the organic acid is a carboxylic acid. One purpose of the surface modification of the aluminum oxide is to make the aluminum oxide particles dispersible in organic solvents, especially in aprotic organic solvents. This broader scope of dispersibility is advantageous in enabling a wider range of organic polymers that are soluble in aprotic organic solvents, but not in water and alcohols, to be used. Other types of surface modification of inorganic oxides, as known in the art of surface modification of inorganic oxides for excellent dispersibility in aprotic organic solvents may be utilized in the present invention.

In one embodiment of the separators of this invention, the aluminum oxide comprises a hydrated aluminum oxide of the formula $Al_2O_3.xH_2O$, wherein x is in the range of 1.0 to 1.5, and wherein the hydrated aluminum oxide is surface modified by treatment with an organic acid to form a modified hydrated aluminum oxide. In one embodiment, the modified aluminum oxide has an $Al_2O_3$ content in the range of 50 to 85% by weight. In one embodiment, the modified aluminum oxide has an $Al_2O_3$ content in the range of 65 to 80% by weight. In one embodiment, the separator comprises 60 to 90% by weight of the modified aluminum oxide. In one embodiment, the separator comprises 70 to 85% by weight of the modified aluminum oxide. In one embodiment, the microporous layer is a xerogel layer. In one embodiment, the organic polymer comprises a polyvinylidene fluoride (PVDF) polymer, such as KYNAR HSV 900, the trade name for a PVDF polymer for lithium battery and other applications available from Arkema, Inc. In one embodiment, the separator comprises a copolymer of a first fluorinated organic monomer and a second organic monomer. In one embodiment, the second organic monomer is a second fluorinated organic monomer.

In one embodiment of the separators of this invention, the electric current producing cell is a secondary lithium ion cell. In one embodiment, the electric current producing cell is a primary lithium cell. In one embodiment, the electric current producing cell is a capacitor. In one embodiment, the separator does not melt at temperatures lower than 300° C. The aluminum oxide or other inorganic oxide material is primarily responsible for providing this non-melting and dimensionally stable property at high temperatures. In one embodiment, the separator is a flame retardant separator. The aluminum oxide or other inorganic oxide is a flame retardant material and, in combination with a highly fluorinated organic polymer which is also flame retardant, provides a flame retardant separator.

Another aspect of the present invention pertains to an electrochemical cell comprising an anode, a cathode, an organic electrolyte comprising a lithium salt, and a separator interposed between the anode and the cathode, wherein the separator comprises a microporous layer comprising (a) at least 50% by weight of an aluminum oxide and (b) an organic polymer, wherein the aluminum oxide is surface modified by treatment with an organic acid. In one embodiment, the organic acid is a sulfonic acid, preferably an aryl sulfonic acid, and more preferably a toluenesulfonic acid. In one embodiment, the organic acid is a carboxylic acid. In one embodiment, the aluminum oxide comprises a hydrated aluminum oxide of the formula $Al_2O_3 \cdot xH_2O$, wherein x is in the range of 1.0 to 1.5, and wherein the hydrated aluminum oxide is surface modified by treatment with an organic acid to form a modified hydrated aluminum oxide.

In one embodiment of the electrochemical cells of this invention, the microporous layer is a xerogel layer. In one embodiment, the anode active material of the anode is lithium. In one embodiment, the modified aluminum oxide has an $Al_2O_3$ content in the range of 50 to 85% by weight. In one embodiment, the modified aluminum oxide has an $Al_2O_3$ content in the range of 65 to 80% by weight. In one embodiment, the organic polymer comprises a polyvinylidene fluoride polymer. In one embodiment, the organic polymer comprises a copolymer of a first fluorinated organic monomer and a second organic monomer. In one embodiment, the second organic monomer is a second fluorinated organic monomer. In one embodiment, the lithium salt is lithium hexafluorophosphate.

Another aspect of the present invention relates to a capacitor comprising two electrodes, an organic electrolyte comprising a tetraalkyl ammonium salt, and a separator interposed between the two electrodes, wherein the separator comprises a microporous layer comprising (a) at least 50% by weight of an aluminum oxide and (b) an organic polymer, wherein the aluminum oxide is surface modified by treatment with an organic acid to form a modified aluminum oxide. In one embodiment, the inorganic oxide comprises a hydrated aluminum oxide of the formula $Al_2O_3 \cdot xH_2O$ wherein x is in the range of 1.0 to 1.5, wherein the aluminum oxide is surface modified by treatment with an organic acid to form a modified aluminum oxide. In one embodiment, the organic acid is a sulfonic acid. In one embodiment, the microporous layer is a xerogel layer. In one embodiment, the organic polymer comprises a polyvinylidene fluoride polymer. In one embodiment, the organic polymer comprises a copolymer of a first fluorinated organic monomer and a second organic monomer.

EXAMPLES

Several embodiments of the present invention are described in the following examples, which are offered by way of illustration and not by way of limitation.

Example 1

A 20% by weight dispersion of DISPAL 10SR, the trade name for a surface-modified aluminum oxide available from SASOL North America, Houston, Tex., in methyl ethyl ketone was prepared. According to the Material Safety Data Sheet (MSDS) by SASOL for DISPAL 10SR, the aluminum oxide is an aluminum boehmite, and the surface modification comprises p-toluenesulfonic acid (PTSA). Separately, a 10% by weight solution of KYNAR HSV 900 in N-methyl pyrrolidone (NMP) was prepared.

The aluminum oxide dispersion was added to the stirred fluoropolymer solution to prepare a dispersion containing the aluminum oxide and fluoropolymer in a dry weight ratio of 5:1. The % solids of this dispersion was about 17%.

This dispersion was coated onto a 3 mil thick silicone treated polyester (PET) film on the silicone release side to give a dry coating thickness of about 20 microns and then delaminated from the release substrate to provide a free standing aluminum oxide microporous separator with a porosity of about 43%. Evaluation of this aluminum oxide microporous separator in a typical lithium ion button cell with a graphite-containing anode, a lithium hexfluorophosphate-containing electrolyte in organic carbonate solvents, and a cobalt oxide-containing cathode showed equal or better chemical stability at 55° C., cycling, and ionic conductivity at 1 C and 5 C charge, in comparison to a control button cell with an Ube polyolefin separator of the same thickness substituted for the aluminum oxide separator.

The aluminum oxide separator did not melt at temperatures below 300° C. and was flame retardant, as shown by not burning when exposed to an open flame.

Example 2

The aluminum oxide and fluoropolymer dispersion of Example 1 was coated onto a 20 micron thick polyolefin separator from Ube and dried at 90° C. to avoid shrinkage and melting of the polyolefin separator. The thickness of the coating was varied from 1 to 4 microns dry and coated on one or both sides of the polyolefin separator. Button cells as described in Example 1 were prepared with a 2 micron thick aluminum oxide microporous coating on one or both sides of the polyolefin separator and gave comparable stability at 55° C., cycling, and conductivity to control button cells with the polyolefin separator only.

Comparative Example 1

A 20% by weight dispersion of DISPAL 10F4, the trade name for a surface-modified aluminum boehmite available from SASOL North America, Houston, Tex., in methyl ethyl ketone was mixed at 2200 rpm stirring for 40 minutes. No satisfactory dispersion was obtained, and nearly all of the pigment settled to the bottom of the mix container. According to the Material Safety Data Sheet (MSDS) by SASOL for DISPAL 10F4, the surface modification comprises formic acid. Separately, a 10% by weight solution of KYNAR HSV 900 in NMP was prepared. The non-dispersed DISPAL 10F4 mix in methyl ethyl ketone was added to the stirred fluoropolymer solution at a dry weight ratio of 3:1 of the aluminum boehmite and fluoropolymer with continued stirring at 2200 rpm for 40 minutes. No satisfactory dispersion was obtained, and nearly all of the pigment settled to the bottom of the mix container. The mix was not suitable for coating a separator layer on a release substrate.

Comparative Example 2

A 7.5% by weight solution of KYNAR HSV 900 in NMP was prepared. To this fluoropolymer solution with stirring at 2200 rpm, DISPAL 10F4 in a dry weight ratio of 5:1 of the aluminum boehmite and fluoropolymer was added slowly with continued stirring at 2200 rpm for 40 minutes. No satisfactory dispersion was obtained, and nearly all of the pigment settled to the bottom of the mix container. The mix was not suitable for coating a separator layer on a release substrate.

Comparative Examples 1 and 2 show that surface modification of an aluminum oxide with formic acid does not provide dispersibility in aprotic solvents as represented by NMP and methyl ethyl ketone and consequently is not suitable for coating separators with polyvinylidene fluoride (PVdF) and other fluoropolymers that require aprotic solvents such as NMP for solubility and for use in coatings, such as a separator or battery electrode coating.

While the invention has been described in detail and with reference to specific and general embodiments thereof, it will be apparent to one skilled in the art that various changes and modifications can be made therein without departing from the spirit and scope thereof.

What is claimed is:

1. A separator for an electric current producing cell comprising a microporous layer, the microporous layer comprising:
   (a) a modified hydrated aluminum oxide formed by surface treating hydrated aluminum oxide with a sulfonic acid to provide the modified hydrated aluminum oxide with dispersibility in aprotic solvents; and
   (b) an organic polymer that is not soluble in water or alcohols.

2. The separator of claim 1, wherein the microporous layer comprises a xerogel layer.

3. The separator of claim 2, wherein the xerogel layer is a continuous xerogel layer and has a porosity of at least 30%.

4. The separator of claim 1, wherein the organic polymer comprises a polyvinylidene fluoride polymer.

5. The separator of claim 1, where the organic polymer comprises a first fluorinated organic monomer and a second organic monomer.

6. The separator of claim 1, wherein the sulfonic acid is an aryl sulfonic acid.

7. The separator of claim 1, wherein the hydrated aluminum oxide comprises a hydrated aluminum oxide of the formula $Al_2O_3 \cdot xH_2O$, wherein x is in the range of 1.0 to 1.5.

8. The separator of claim 1, wherein the separator comprises 50% to 85% by weight of the modified hydrated aluminum oxide.

9. The separator of claim 1, wherein the microporous layer has an average pore diameter from 2 nm to 70 nm.

10. A separator for an electric current producing cell comprising a microporous layer, the microporous layer comprising:
    (a) a modified hydrated aluminum oxide formed by surface treating hydrated aluminum oxide with a sulfonic acid to provide the modified hydrated aluminum oxide with dispersibility in aprotic solvents; and
    (b) an organic polymer;
    wherein the separator is flame retardant and does not melt at temperatures lower than 300° C.

11. The separator of claim 10, wherein the organic polymer is not soluble in water or alcohols.

12. The separator of claim 10, wherein the organic polymer is a fluorinated organic polymer.

13. An electrochemical cell comprising:
    an anode,
    a cathode,
    an organic electrolyte comprising a lithium salt, and
    a separator interposed between the anode and the cathode, wherein the separator comprises a microporous layer, the microporous layer comprising:
      (a) a modified hydrated aluminum oxide formed by surface treating hydrated aluminum oxide with a sulfonic acid to provide the modified hydrated aluminum oxide with dispersibility in aprotic solvents; and
      (b) an organic polymer that is not soluble in water or alcohols.

14. The electrochemical cells of claim 13, wherein the anode active material of the anode is lithium.

15. The electrochemical cell of claim 13, wherein the microporous layer is a xerogel layer.

16. The electrochemical cell of claim 15, wherein the xerogel layer is a continuous xerogel layer and has a porosity of at least 30%.

17. The electrochemical cell of claim 13, wherein the organic polymer comprises a polyvinylidene fluoride polymer.

18. The electrochemical cell of claim 13, where the organic polymer comprises a first fluorinated organic monomer and a second organic monomer.

19. The electrochemical cell of claim 13, wherein the sulfonic acid is an aryl sulfonic acid.

20. The electrochemical cell of claim 13, wherein the hydrated aluminum oxide comprises a hydrated aluminum oxide of the formula $Al_2O_3 \cdot xH_2O$, wherein x is in the range of 1.0 to 1.5.

21. The electrochemical cell of claim 13, wherein the separator comprises 50% to 85% by weight of the modified hydrated aluminum oxide.

22. The electrochemical cell of claim 13, wherein the microporous layer has an average pore diameter from 2 nm to 70 nm.

23. A method of making a battery separator for use in an electric current producing cell comprising the steps of:
    (a) preparing a dispersion of modified aluminum oxide, wherein the modified hydrated aluminum oxide has been formed by treatment with a sulfonic acid to provide the modified hydrated aluminum oxide with dispersibility in aprotic solvents;
    (b) preparing an organic polymer solution comprising an organic polymer that is not soluble in water or alcohols;
    (c) mixing the dispersion of Step (a) and the solution of Step (b); and
    (d) coating the mixture of Step (c) onto a substrate.

24. The method of claim 23, wherein the substrate is a release substrate and the method further comprises the steps of: (e) drying the coating and (f) delaminating the dry coating from the release substrate.

25. The method of claim 23, wherein the substrate is a porous separator material.

26. The method of claim 25, wherein the porous separator material is a polyolefin separator material.

27. A method of making an electric current producing cell comprising the steps of:
    (a) providing an anode;
    (b) providing a cathode; and
    (c) interposing a microporous separator between the anode and the cathode to form a separator/electrode cell, wherein the microporous separator comprises a microporous layer comprising: a modified hydrated aluminum oxide formed by surface treating hydrated aluminum oxide with a sulfonic acid to provide the modified hydrated aluminum oxide with dispersibility in aprotic solvents; and an organic polymer that is not soluble in water or alcohols.

28. The method of claim 27, wherein there are further steps of:
    (d) enclosing the separator/electrode cell in a casing;
    (e) filling the casing with electrolyte; and
    (f) sealing the casing.

29. The method of claim 27, wherein the microporous layer comprises a xerogel layer.

30. The method of claim 27, wherein the microporous layer comprises a continuous xerogel layer with a porosity of at least 30%.

31. The method of claim 27, wherein the organic polymer comprises a polyvinylidene fluoride polymer.

32. The method of claim 27, wherein the organic polymer comprises a first fluorinated organic monomer and a second organic monomer.

33. The method of claim 27, wherein the sulfonic acid is an aryl sulfonic acid.

34. The method of claim 27, wherein the hydrated aluminum oxide comprises a hydrated aluminum oxide of the formula $Al_2O_3 \cdot xH_2O$, wherein x is in the range of 1.0 to 1.5.

35. The method of claim 27, wherein the separator comprises 50% to 85% by weight of the modified hydrated aluminum oxide.

36. The method of claim 27, wherein the microporous layer has an average pore diameter from 2 nm to 70 nm.

* * * * *